United States Patent
Love

(10) Patent No.: US 9,429,926 B2
(45) Date of Patent: Aug. 30, 2016

(54) AUTOMATION AND MOTION CONTROL SYSTEM

(71) Applicant: TAIT TOWERS MANUFACTURING, LLC, Lititz, PA (US)

(72) Inventor: James D. Love, Lititz, PA (US)

(73) Assignee: TAIT TOWERS MANUFACTURING, LLC, Lititz, PA (US)

( * ) Notice: Subject to any disclaimer, the term of this patent is extended or adjusted under 35 U.S.C. 154(b) by 307 days.

(21) Appl. No.: 14/279,943

(22) Filed: May 16, 2014

(65) Prior Publication Data

US 2015/0331398 A1 Nov. 19, 2015

(51) Int. Cl.
*G05B 15/02* (2006.01)
*H04L 29/08* (2006.01)
*G05B 19/042* (2006.01)
*H05B 37/02* (2006.01)

(52) U.S. Cl.
CPC ........... *G05B 15/02* (2013.01); *G05B 19/0421* (2013.01); *H04L 67/10* (2013.01); *G05B 2219/2664* (2013.01); *H05B 37/029* (2013.01)

(58) Field of Classification Search
CPC ................ G05B 19/0421; G05B 2219/2664; G05B 15/02; H05B 37/029; H04L 67/10
See application file for complete search history.

(56) References Cited

U.S. PATENT DOCUMENTS

| | | | |
|---|---|---|---|
| 4,392,187 A | 7/1983 | Bornhorst | |
| 4,710,819 A | 12/1987 | Brown | |
| 4,947,302 A | 8/1990 | Callahan | |
| 4,980,806 A | 12/1990 | Taylor et al. | |
| 5,209,560 A | 5/1993 | Taylor et al. | |
| 5,544,282 A | 8/1996 | Chen et al. | |
| 5,769,527 A | 6/1998 | Taylor et al. | |
| 5,920,476 A | 7/1999 | Hennessey et al. | |
| 5,923,132 A | 7/1999 | Boyer | |
| 5,988,850 A | 11/1999 | Kumiya | |
| 6,209,852 B1 | 4/2001 | George et al. | |
| 6,297,610 B1 | 10/2001 | Bauer et al. | |
| 6,459,919 B1 | 10/2002 | Lys et al. | |
| 6,600,289 B2 | 7/2003 | George et al. | |
| 6,873,355 B1 | 3/2005 | Thompson et al. | |
| 7,080,824 B1 | 7/2006 | George et al. | |

(Continued)

FOREIGN PATENT DOCUMENTS

| | | |
|---|---|---|
| WO | 97/25661 A1 | 7/1997 |
| WO | 98/25197 A2 | 6/1998 |

(Continued)

OTHER PUBLICATIONS

XLNT Advanced Technologies Manufacturing BV, User Manual, Cyberhoist CH 1000/500/250 EU/US, Jan. 2009, Version 3, 32 pgs.

(Continued)

*Primary Examiner* — Charles E Anya
(74) *Attorney, Agent, or Firm* — McNees Wallace & Nurick, LLC

(57) ABSTRACT

An automation and motion control system for the entertainment industry is used to dynamically respond to random or unknown inputs as well as known inputs and to coordinate the movement and operation of the objects, such as theatrical props, cameras, stunt persons, lighting, scenery, drapery, kinetic art sculptures, moving displays or other similar types of devices or items, on a large scale.

10 Claims, 7 Drawing Sheets

(56) References Cited

U.S. PATENT DOCUMENTS

| | | |
|---|---|---|
| 7,080,825 B1 | 7/2006 | George et al. |
| 7,971,856 B2 | 7/2011 | Kochan |
| 8,615,312 B2 | 12/2013 | Colombo et al. |
| 2006/0190101 A1 | 8/2006 | Seizinger |
| 2007/0191966 A1* | 8/2007 | Fisher .................. A63J 1/02 700/1 |
| 2008/0048864 A1 | 2/2008 | Mayhew |
| 2008/0314528 A1 | 12/2008 | Davis et al. |
| 2009/0015426 A1 | 1/2009 | Long et al. |
| 2010/0324703 A1 | 12/2010 | Mayhew |
| 2012/0029688 A1 | 2/2012 | Lager et al. |
| 2013/0310951 A1 | 11/2013 | Fisher |
| 2015/0120080 A1* | 4/2015 | Densham ............... A63J 1/00 700/302 |

FOREIGN PATENT DOCUMENTS

| | | |
|---|---|---|
| WO | 02/10869 A1 | 2/2002 |
| WO | 2011079115 A1 | 6/2011 |
| WO | 2011079122 A1 | 6/2011 |

OTHER PUBLICATIONS

FTSI Automation, F315/F515 Self-Contained Flying Winches, 2 pages.

FTSI Automation, Navigator System, Software and Operator Interface Manual, Sep. 2009, Version 2.1, 320 pages.

* cited by examiner

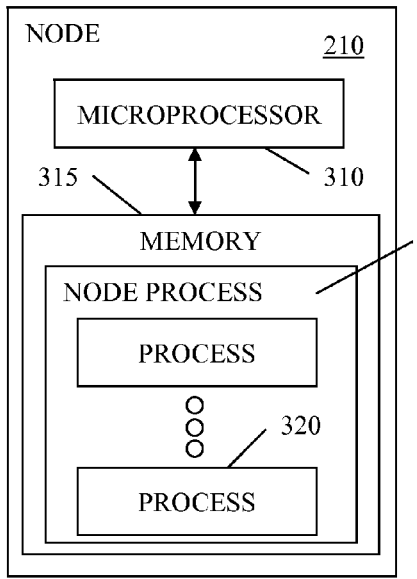
FIG. 3
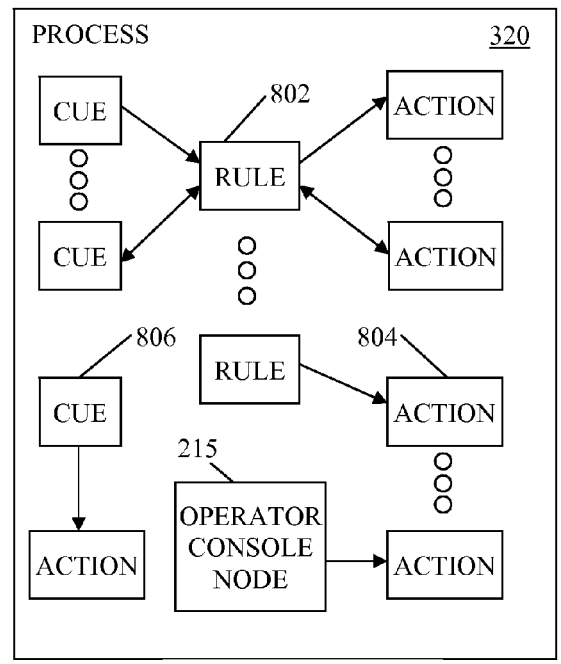
FIG. 4
Rule Text
IF AXIS_SHOP_SE (axis_shop_se/axis, 1) velocity is greater than 5.0 ft/sec
THEN Disable motion;
ON FAULT: Disable motion.
FIG. 6

| Name | Type | Value |
|---|---|---|
| Actual Position | float | 0.00016 |
| Actual Velocity | float | 0.0 |
| PositionError | float | 0.0 |
| TargetTime | float | 0.0 |
| TargetPosition | float | 100.00016 |
| CmdPosition | float | 0.00016 |
| JogVelocity | float | 0.0 |
| CmdVelocity | float | 0.0 |
| Acc | float | 0.0 |
| CmdAcc | float | 0.0 |
| Jerk | float | 0.0 |
| CmdJerk | float | 0.0 |
| Status | dword | 00001018 |
| [Enabled, homed, Move, Rdy] | | |
| Limits | dword | 00430000 |
| [HW Enabled, Rule Enabled, Soft Enabled] | | |
| HW_Bits | dword | 27000000 |
| [Brake Breaker Sens, Drive Breaker sens, Drive Contact Sens, Drive Ready Sens] | | |
| Bypasses | dword | 00000000 |
| [] | | |
| ControlSource | string | server_tait_dev/play.1 |
| JogSources | string | |
| JogValueSource | string | |
| JogActiveSource | string | |
| JogActiveCondDef | string | |
| JogType | dword | 00000000 |
| [] | | |
| JogValueSourceTS | string | |
| JogActiveSourceTS | string | |
| JogActiveCondDefTS | string | |
| JogValueSourceLim | string | |
| JogActiveSourceLim | string | |
| JogActiveCondDefLim | string | |
| RulesState | string | 3: 1, 4: 1 |
| RulesDisSrc | string | |
| DrvTiming | string | |
| DrvPosInt | int | 25 |
| AbsPosInt | int | 1 |
| CmdTimeScale | float | 100.0 |
| TimeScale | float | 100.0 |

AUTOMATION AND MOTION CONTROL SYSTEM

BACKGROUND

The application generally relates to an automation and motion control system. The application relates more specifically to an automation and motion control system for the entertainment industry that can dynamically respond to random or unknown inputs into the system.

In the entertainment industry, to provide a realistic atmosphere for a performance or production, e.g., theatrical, musical, movie, television, etc., objects or components can be moved or controlled by an automation and motion control system during (and between) events in the performance or production, e.g., scenes on a stage or takes on a motion picture production set. In addition, automation and motion control systems can be used to move objects or components for other purposes or performances such as kinetic art or sculptures and/or moving displays. Automation of the movement and control of the objects or components is desirable for safety, predictability, efficiency, and economics.

For proper operation of the automation and motion control system, all of the objects or components under the control of the automation and control system have to know when to act or move, e.g., at a particular time or in a particular sequence, and the objects or components have to know what action or movement is required in response to the actions or movements of other objects or components. One way to ensure that all of the components are operating appropriately, i.e., taking appropriate actions or movements at the appropriate times, is to pre-program all of the actions, movements and timings for all of the components so each components knows what actions or movements to take and when to take the action or movement.

As an example of a pre-programmed sequence, a theatrical performance may call for a battle scene. In the battle, a first stunt person is to fly through the air and then collide with a second stunt person, where the second stunt person is struck so hard that the second stunt person is thrown backward into and through a wall. To set up this stunt, each of the first and second stunt persons is hung from respective cables. Each cable is attached to a separate winding mechanism powered by an electrical motor, for instance, a winch. In the stunt, the first stunt person falls while attached to a cable towards the second stunt person. The winch stops the cable, and the first stunt person's movement, just as the first stunt person hits the second stunt person. While not seen by the audience, each person wears some padding so that their minor impact will not hurt either person. The second winch is synchronized (with the first winch) to pull on the cable attached to the second stunt person so hard that it appears that the second stunt person has been struck by the first stunt person. The second winch then continues to pull the second stunt person's cable until the second player's body hits an easily breakable wall. Finally, the second winch stops the second stunt person's cable when the second stunt person's body has passed through the easily breakable wall. The control system controls the coordination of the winding and reeling between the first and second winches to ensure the safety of the stunt persons.

One drawback to pre-programming the actions and movements of the components is that the components will act or move in the same sequence each time the system is operated, even if the surrounding conditions have changed. If the actual surrounding conditions do not match the conditions expected by the pre-programmed system, an unsafe condition could occur that could cause injury to the performers or audience or damage the components or surrounding areas. At a minimum, a discrepancy between the actual surrounding conditions and the expected conditions will result in a less than optimal performance or production because the movements and actions of the components will be "out-of-synch" with the surrounding conditions.

Therefore, what is needed is a control system for a performance or production in the entertainment industry that can dynamically respond to unexpected or unknown conditions and/or inputs to continually adapt the movement and actions of the components of the performance or production to the surrounding conditions.

SUMMARY

The present application is directed to an automation and motion control system to dynamically control a plurality of objects and continually adjust operation of the objects. The control system includes a plurality of nodes in communication with each other over a network. Each node of the plurality of nodes corresponds to at least one item of equipment used to a control an object. Each node of the plurality of nodes includes a microprocessor and a memory device. The memory device includes a node process and at least one process executable by the microprocessor. The at least one process is used to dynamically control the operation of the at least one item of equipment. The at least one process revising dynamically the operation of the at least one item of equipment in response to receiving a random input at the node.

The present application is also directed to a computer implemented method to adapt operation of an automation and motion control system to a random input. The method includes determining whether an input has been received at a node of the automation and control system. The node includes a microprocessor and a memory device. The method also includes determining, by the node, whether the received input is a random input and identifying, by the node, at least one process of the node associated with the received input in response to the determination the received input is a random input. The method further includes executing, by the node, the identified at least one process to adapt the operation of the automation and motion control system to the random input.

One embodiment of the present application includes an automation and motion control system to control a plurality of objects used in performances. The control system includes a plurality of nodes in dynamic communication with each other over a real time network. Each node of the plurality of nodes corresponds to at least one item equipment used to a control a performance object. Each node of the plurality of nodes includes a microprocessor and a memory device. The memory device includes a node process and at least one process executable by the microprocessor. The at least one process is used to dynamically control the operation of the at least one item of equipment. The at least one process has one or more of cues, rules and actions to generate the control instructions to dynamically control the operation of the at least one item of equipment.

Another embodiment of the present application includes a performance objects automated motion control system, program product, and method that provides, in various implementations, techniques for large scale motion and device control. Non-hierarchical performance object movement techniques are provided to permit combinations of multiple devices on a network to function as would a single machine.

Full-function scalability is provided from one to many machines, wherein neither processor nor device boundaries exist but rather each device has the option of exchanging its operational data with any other device at any time, in real time. Techniques are provided for coordinating the movement and control of performance objects, e.g., theatrical props, cameras, stunt persons (e.g., "wirework"), lighting, scenery, drapery, kinetic art sculptures, moving displays and other equipment, during a performance.

One advantage of the present application is the ability of a component to dynamically respond to an unknown or random input and provide signals or control instructions to other components based on the random input received by the component.

Another advantage of the present application is the use of rule functions or groups by a component to dynamically respond to an action or event occurring at another component.

Still another advantage of the present application is that a component can perform self-monitoring functions with respect to preselected safety and accuracy parameters.

A further advantage of the present application is the ability of a component to function autonomously without having to receive global control instructions.

Another advantage of the present application is that it can display data about cues, machines in motion, machines on e-stop, status of the machines to be used on the next cue or any alerts generated from sensors incorporated in the system.

Other features and advantages of the present application will be apparent from the following more detailed description of the disclosed embodiments, taken in conjunction with the accompanying drawings which illustrate, by way of example, the principles of the application.

BRIEF DESCRIPTION OF THE DRAWINGS

FIG. 3 schematically shows an embodiment of a node from the automation and motion control system.

FIG. 4 schematically shows an embodiment of a sub- or co-process of a node process.

FIG. 6 shows an embodiment of a screen display from the control system showing the rule text for a rule created in the interface of FIG. 9.

FIG. 7 shows an embodiment of a screen display from the control system showing a table corresponding to a data vector that is shared with other devices.

FIG. 8 shows an embodiment of a screen display from the control system showing sequential motion sequences.

Wherever possible, the same reference numbers are used throughout the drawings to refer to the same or like parts.

DETAILED DESCRIPTION OF THE EMBODIMENTS

Figure 1:
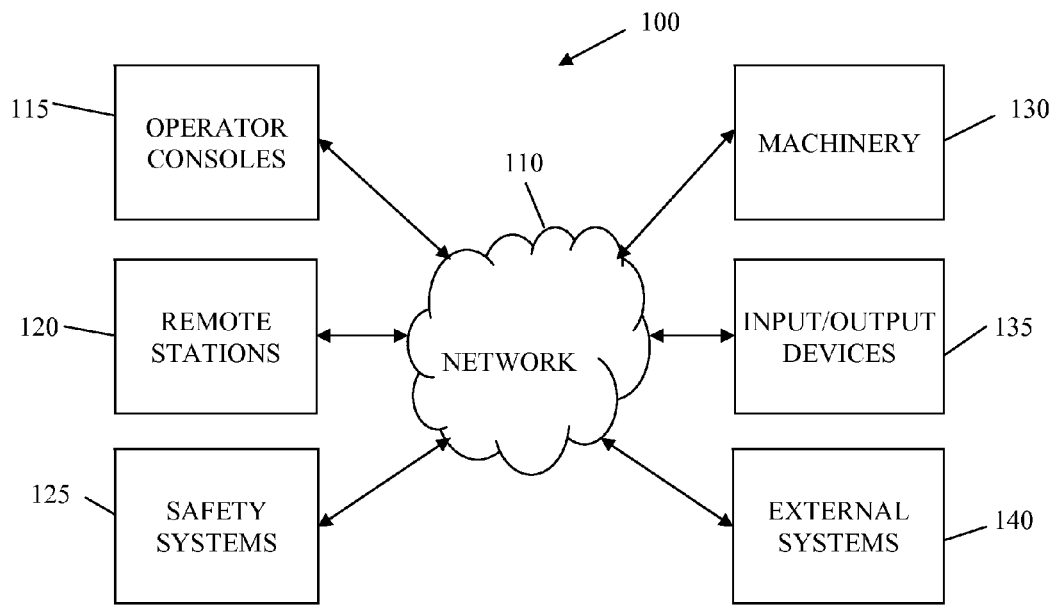
FIG. 1 schematically shows an embodiment of an automation and motion control system.

FIG. 1 shows an embodiment of the automation and motion control system of the present application. The automation and motion control system 100 can include a network, e.g., real-time network(s) and/or a communication network(s) 110 interconnecting operator consoles 115, remote stations 120, safety systems 125, machinery 130, input/output devices 135 and external systems 140. In one embodiment, safety systems 125 can include emergency stop (e-stop) systems; machinery 130 can include lifts, chain hoists, winches, elevators, carousels, turntables, hydraulic systems, pneumatic systems, multi-axis systems, linear motion systems (e.g., deck tracks and line sets), audio devices, lighting devices, pyrotechnic devices, water effect devices, smoke effect devices and/or video devices; input/output devices 135 can include incremental encoders, absolute encoders, variable voltage feedback devices, resistance feedback devices, tachometers and/or load cells; and external systems 140 can include show control systems, industrial protocols and third party software interfaces including 0-10 V (volt) systems, Modbus RTU systems, Modbus TCP systems, Profibus systems, ArtNet systems, BMS (Building Management System) systems, EtherCat systems, DMX systems, SMPTE (Society of Motion Picture and Television Engineers) systems, VITC systems, MIDI (Musical Instrument Digital Interface) systems, MIDI show control systems; MIDI machine control systems, MANET (Mobile Ad hoc NETwork) systems, K-Bus systems, Serial systems (including RS 485, RS 422 and RS 232), Ethernet systems, TCP/IP (Transmission Control Protocol/Internet Protocol) systems, UDP (User Datagram Protocol) systems, ControlNet systems, DeviceNet systems, RS 232 systems, RS 485 systems, CANbus (Controller Area Network bus) systems, CANOpen systems; Interbus systems; DALI (Digital Addressable Lighting Interface) systems; LONbus (Local Operating Network bus) systems; EnOcean systems; Pathport systems; Stage Technologies systems; Chainmaster Interbus systems; Cyberhoist TCP/IP systems; Show Distribution systems; Maya systems, Lightwave systems, Catalyst systems, 3ds Max or 3D Studio Max systems, C4D (Cinema 4D) systems, ProfiNET systems, PosiStageNet systems, Kuka RSI (Robot Sensor Interface) systems, ABB RRI (Robot Reference Interface) systems, EAP (EtherCAT Automation Protocol) systems, MAVLink (Micro Air Vehicle Communications Protocol) systems, PTP (Precise Time Protocol) systems, AS-Interface (Actuator Sensor Interface) system, Lightbus systems, EtherNET/IP (Ethernet Industrial Protocol) systems, and/or a custom designed system.

Figure 2:
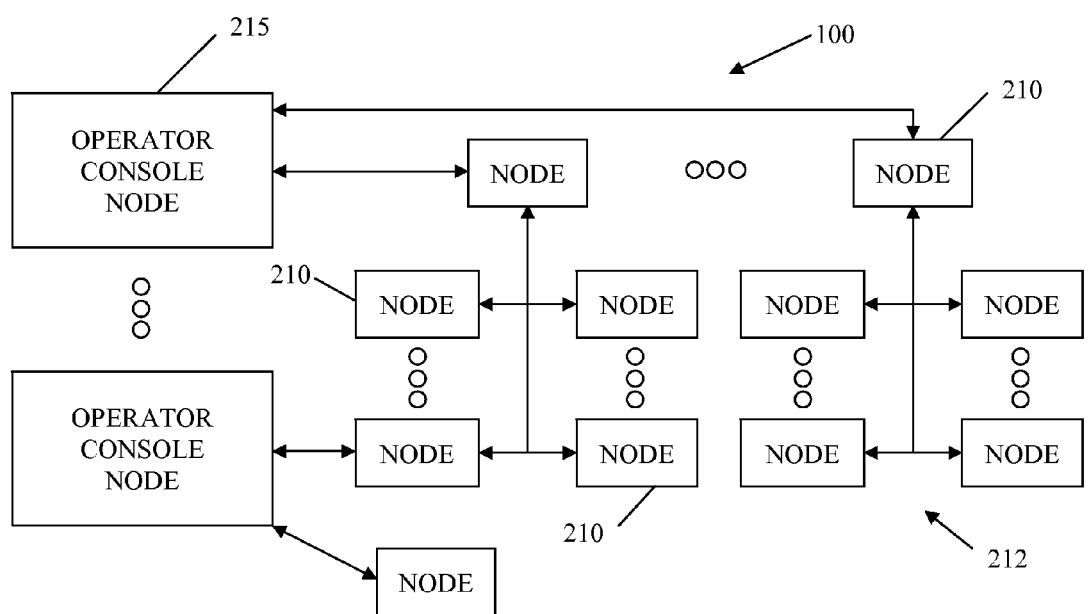
FIG. 2 schematically shows an alternate embodiment of an automation and motion control system.

FIG. 2 shows an alternate embodiment of the automation and motion control system 100. The automation and motion control system 100 shown in FIG. 2 can be formed from the interconnection of logical nodes 210. Each node 210 can be a specific component or device (or group of components or devices) from operator consoles 115, remote stations 120, safety systems 125, machinery 130, input/output devices 135 and external systems 140. One specific type of node 210 can be an operator console node 215 associated with a specific component or device from operator consoles 115 that can enable an operator to interact with the control system 100, i.e., to send data and instructions to the control system 100 and to receive data and information from the control system 100. The operator console node 215 is similar to the other nodes 210 except that the operator console node 215 can include a graphical user interface (GUI) or human-machine interface (HMI) to enable the operator to interact with the control system 100. In one embodiment, the operator console node 215 can be a Windows® computer.

The operator(s) can make inputs into the system 100 at operator console nodes 215 using one or more input devices, e.g., a pointing device such as a mouse, a keyboard, a panel of buttons, a touch device or other similar devices. As shown in FIG. 2, nodes 210 and operator console nodes 215 are interconnected with each other. Thus, any node 210, 215 can communicate, i.e., send and receive data and/or instructions, with any other node 210, 215 in the control system 100. In one embodiment, a group of nodes 210 can be arranged or configured into a network 212 that interconnects the nodes 210 in the group and provides a reduced number of connections with the other nodes 210. In another embodiment, nodes 210 and/or node networks 212 can be interconnected in a star, daisy chain, ring, mesh, daisy chain loop, token ring, or token star arrangement or in combinations of those arrangements. In a further embodiment, the control system 100 can be formed from more or less nodes 210 and/or node networks 212 than those shown in FIG. 2.

Each node 210 can be independently operated and self-aware, and can also be aware of at least one other node 210. In other words, each node 210 can be aware that at least one other node 210 is active or inactive (e.g., online or offline). In another embodiment, each node 210 is independently operated using decentralized processing, thereby allowing the control system 100 to remain operational even if a node 210 may fail because the other operational nodes 210 still have access to the operational data of the failed node 210. Each node 210 can be a current connection into the control system 100, and can have multiple socket connections into the network 110, each providing node communications into the control system 100 through the corresponding node 210. As such, as each individual node 210 is taken "offline," the remaining nodes 210 can continue operating and load share. In a further embodiment, the control system 100 can provide the operational data for each node 210 to every other node 210 all the time, regardless of how each node 210 is related to each other node 210.

FIG. 3 schematically shows an embodiment of a node 210. Each node 210 (or operator console node 215) includes a microprocessor 310 and a memory device 315. The memory device 315 can include or store a main or node process 317 that can include one or more sub- or co-processes 320 that are executable by the microprocessor 310. The main or node process 317 provides the networking and hardware interfacing to enable the sub- or co-processes 320 to operate. The microprocessor 310 in a node 210 can operate independently of the other microprocessors 310 in other nodes 210. The independent microprocessor 310 enables each node 210 in the control system 100 to operate or function as a "stand-alone" device or as a part of a larger network. In one embodiment, when the nodes 210 are operating or functioning as part of a network, the nodes 210 can exchange information, data and computing power in real time without recognizing boundaries between the microprocessors 310 to enable the control system 100 to operate as a "single computer." In another embodiment, each node 210 may use an embedded motion controller.

Each node 210 can include a computing device such as a process controller, a thin client, a palm top computer, single board computer (SBC), programmable logic controller (PLC), field programmable gate array (FPGA) device and/or a microprocessor. While most nodes 210 are associated with physical or tangible components or devices, a node 210 can be associated with a software device like a "player" or a "virtual machine," which is not a tangible piece of machinery capable of being held in one's hand but is instead a software construct that is considered by the control system 100 to be a component or device. The node 210 for the software device can supply commands and receive back a status, yet the software device doesn't exist as a physical device. In one embodiment, each node 210 can execute the QNX real time operating system.

In one embodiment, one or more nodes 210 can be "axis" devices or nodes. The "axis" device or node can be used represent any piece of machinery that moves an object. The machinery can be operated by hydraulic, electric, or pneumatic systems. The control system 100 can be used with a variety of different axis devices or nodes that correspond to the controllers for the end machines that make theatrical objects move. Examples of axis machinery can include engines, motors (AC/DC), servos, hydraulic movers, and pneumatic movers. In another embodiment, one or more nodes 210 can be input/output nodes or controllers for transferring command signals in and out of the control system 100, usually from other systems, e.g., light and/or power switches, or other system components. In one embodiment, there can be multiple channels of on/off switches for turning on and off different types of equipment or devices, e.g., lights, object movement machines, etc. The control system 100 can also include one or more "server" nodes or devices that can correspond to computing devices or systems having a large storage capacity (e.g., hard drives) that can handle more robust computing tasks than other, smaller, computing devices having less storage capacity.

All of the nodes 210 of the control system 100 can have a corresponding network address or internet protocol (IP) address to enable communication between the nodes 210. In addition, each node 210 can have a corresponding status, i.e., "online" or "offline." When a node 210 is offline or disabled, e.g., "unplugged" or "not hooked up," the effect is that the node 210, 215 is no longer available to the control system 100 for operation, even though the control system 100 is still aware of the node 210. During operation of the control system 100, the operation status of the nodes 210 can be changed between online or active and offline or disabled as needed for the performance or production. For example, once the control system 100 for a stage production is started and operating, one or more nodes 210 can join, i.e., change from "offline" to "online" at any point in time during the production. During the performance, there can be times when a performance object is not to be moved at all during the performance, in which case a node 210 corresponding to that performance object can be taken offline so there is no way that the object can be moved or the node 210 accessed or operated accidentally. When an offline node 210 is intentionally brought back online either automatically or as a result of an operator command, the node 210 sends a universally available data vector announcing that it is back online.

The operator console node 215 can display information on the nodes 210 in the control system 100. The operator console node 215 can display a list or table of all the different nodes 210, the addresses of the different nodes 210, the status of the nodes 210, what the different nodes 210 are doing, how many processes the different nodes 210 are executing, and any inter-node communications. The operator console node 215 can display any data for any specific node 210 because there is no centralized data processing, but rather all data processing is decentralized.

FIG. 4 schematically shows an embodiment of a sub- or co-process executed by a node 210. Each sub- or co-process 320 includes one or more actions 804 that can be triggered by one or more rules 802 and/or one or more cues 806 or by a direct command from an operator console interface 215. In another embodiment, one or more cues 806 can trigger one or more rules 802 or one or more actions 804 can trigger one or more rules 802. For example, one or more rules 802 can initiate one or more actions 804 in response to one or more cues 806.

Each rule 802 can be an if-then or an and-or statement or other similar type of case or logic statement. The cues 806 can be associated with the "if" conditions of the rule and can include measured parameters, e.g., velocities, accelerations, positions, voltages, currents, etc., and logic inputs, e.g., "1s" or "0s," from other nodes 210. The actions 804 can be associated with the "then" portion of the rule and can include controlling an operating speed of the machine(s) associated with the nodes 210, sending messages or commands to other nodes 210, changing operational status, e.g., on or off, of system components, e.g., lights, relays or switches.

Figure 5:
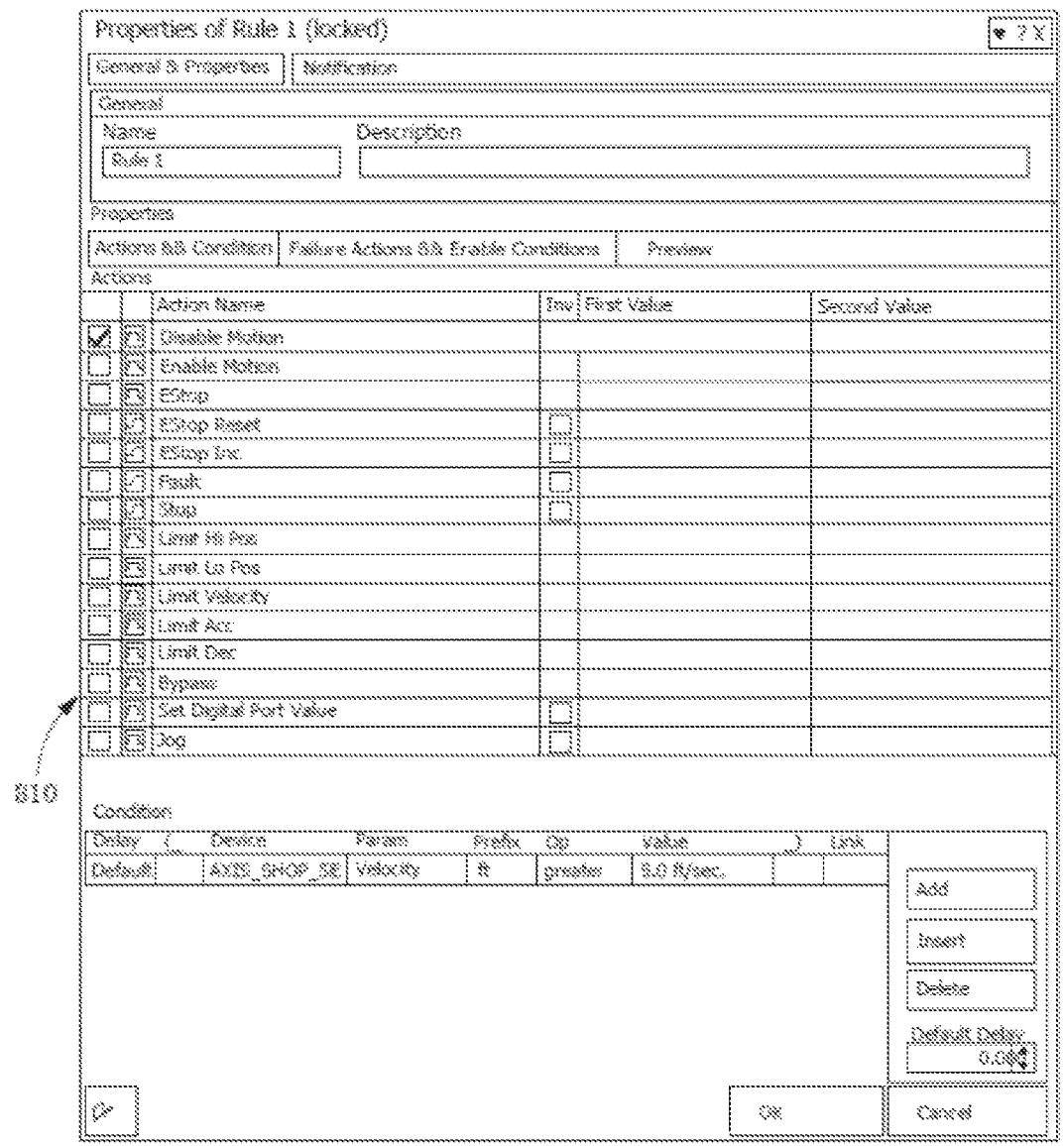
FIG. 5 shows an embodiment of a screen display from the control system for setting properties for a rule for a device.

FIG. 5 shows an embodiment of a screen display to set properties for a rule for a node 210. An input mechanism or functionality 808 can be used with a preselected list of actions 810 to permit an operator to select a desired action and then set the cues for the rule(s) to trigger the action. In the embodiment of FIG. 5, the input mechanism or functionality 808 is setting properties or cues for a rule relating to an "AXIS_SHOP_SE" node process for an "axis_shop_se" node. The information entered in the input mechanism 808 can be translated into rule text as shown in FIG. 6. In the embodiment of FIG. 6, the rule is written to disable the associated machine's motion for the "axis_shop_se" node in response to whether the associated machine for the "axis_shop_se" node has a velocity that is greater than five feet per second.

The operational instructions or rules for a node 210 can be set in any way desired for any machine at any time. For example, performance object movement control can be changed at an operator console 215 from one set up for a live performance having one set of rules to another set up having a different set of rules for a maintenance procedure for the performance. When a maintenance crew arrives and logs in to the control system 100, the control system 100 can be configured to set all of the machines so that they will not move any performance object faster than 10% of live performance speed. In contrast, when the show crew arrives and logs in, the control system 100 can be configured for the live performance set of rules and the maintenance set of rules are then turned off so that performance objects can then move in accordance with the show rules that can permit top speed movement, maximum heights and length and other show functionality. In a further embodiment, there can be several sets of universal performance rules that can be used for a performance.

Referring back to FIG. 3, each node 210 can have sub- or co-processes 320 that are executed on the node 210. Each sub- or co-process 320 can include one or more threads that correspond to the instructions that are executed in a particular sub- or co-process 320. For example, a sub- or co-process of the "axis_shop_se" node can be a software algorithm executed on the microprocessor 310 of the node 210 to dynamically generate instructions for a motor operating a corresponding winch and thereby control movement of the cable for the winch. For example, if an instruction is given to move a performance object at the end of a cable of a winch a total of 30 feet at 4 feet per second and then stop, the sub-process 320 can perform all of the calculations required to generate the voltages and currents necessary for the motor to accomplish the desired cable movement.

As part of the data sharing and communication among nodes 210, if anything changes on a node 210, a management thread of the node 210 can ensure that all the other nodes 210 on the network 110 can be informed as to the change(s). FIG. 7 shows an embodiment of a table corresponding to a data vector used to exchange information among nodes 210. In the embodiment shown in FIG. 7, a table 460 for the "Server Tait Dev" node includes information that can be exchanged with other nodes 210. The "type" column 462 shows the kind of string, and the "value" column 464 depicts a rule state or corresponding value for a parameter in the data vector. The data vector can be used to permit the control system 100 to be customized for the requirements of a particular event. For example, the features of the graphical user interface (GUI), e.g., information, presentation, filtering, conditional displays, conditional color coding, conditional access, conditional actions and performance limiting measures ("rules"), the ability to write, record, edit, re-order, re-structure, and segregate the playback sequences at will, and the provision for any number of operator interfaces with multiple login levels to have access to the system 100 simultaneously, can all be customized for the event.

Figure 8:
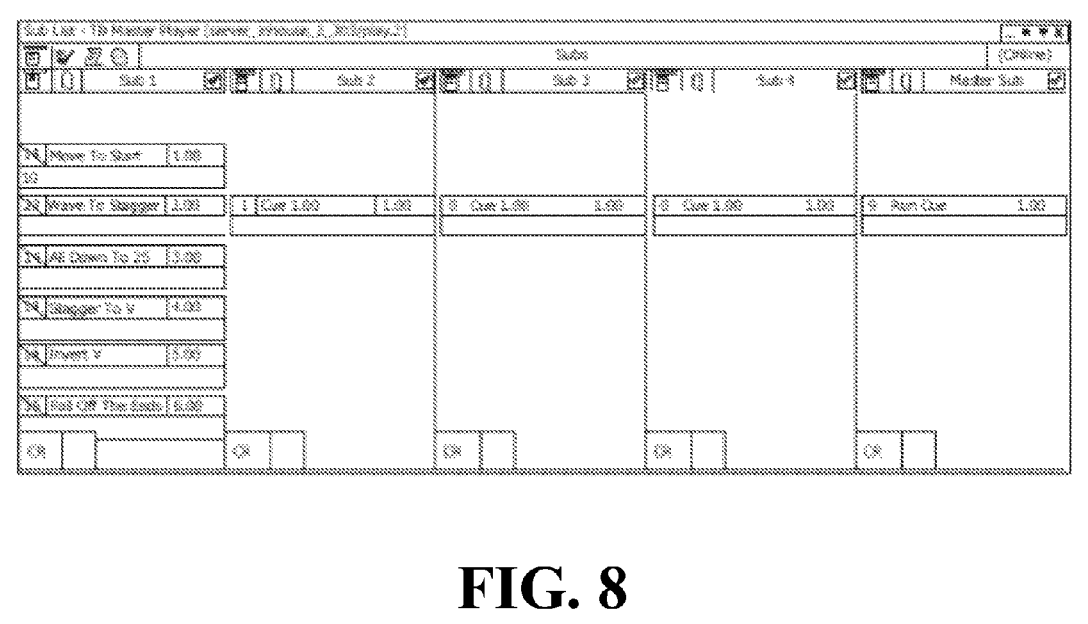

FIG. 8 shows an embodiment of a screen display showing sequential motion sequences or profiles. For example, a motion sequence or profile can include a main curtain being moved out, scenery being moved in and the drop of a main lift in the downward direction. The sequence of instructions for the motions to be performed can be organized into a cue. The cue can be executed by a "player" process. The "player" process can include one or more lists of one or more cues. Each list of cues can be arranged into a "submaster" player. The individual actions or instructions within the submaster player corresponds to the list of actions and instructions in each of the cues that form the list of cues for the submaster player. A "master" player can be used to execute cues from other submaster players. In one embodiment, any sequence of performace object movements can be dynamically executed, by demand of an operator, any time during a performance by selecting particular cues or triggers from particular submaster players.

In another embodiment, the "player" process can "play" a list or cue of motion commands. The motion commands can provide rules or instructions to a node 210 based on the conditions set by the rule. For example, the rule may specify limitations on velocity, position or location, whether the node 210 is enabled or disabled, and when and whether the node 210 is to stop its action or movement. The instructions that are performed by the node 210 can be dependent upon the conditions that have been satisfied. When a condition is satisfied, the node 210 "goes active" and performs those instructions that are permitted by that satisfied condition.

The conditions set by the rules allow for the actions or movements of the machine(s) or equipment associated with the node 210 to be coordinated and interrelated with one or more other nodes 210 dynamically. For example, there can be one "axis" node that can be assigned to each of a number of winches that wind and unwind respective cables. A node 210 may also be assigned to a supervisory safety system which monitors the status of each of the winches to ensure compliance with all expected statuses. The supervisory safety system node can turn off power to any winch that is non-compliant with its expected status. There may also be two nodes 210 assigned to an "operating controller." The operating controller can monitor data from each winch, share that data with all other nodes 210, and display the data for an operator. The movement and status of each machine assigned to an "axis" node can be related to both itself and to the movement and status of each other machine that is assigned to that respective "axis" node.

In one embodiment, conditional movement rules can be associated with the winding and unwinding of a "First Winch." For example, when the First Winch is executing a winding motion, but its winding speed is below a maximum speed and the end of the cable being wound by the First Winch is located farther away than a minimum separation from the end of a second cable of a "Second Winch," then the First Winch will stop and unwind its cable by a predetermined length. The end of the cable of the First Winch can be controlled as to permissible lengths with maximum positions and maximum speeds, such as by setting a limit on a maximum velocity of the winding of the cable so as to be based upon the velocity of the end of the cable of another winch that is assigned to another node 210 in the system 100.

A space control node enables a user or operator to work with sets of interrelated "axis" nodes (machines), where arguments or cues for the "axis" nodes are executed by "player processes." Each argument or cue can have lists of motion groups or routines that define what list each motion group is in, which sub-list the motion group is in, and which cue the motion group is in. Constructs can be programmed to incorporate, integrate and interrelate multiple machines/axis nodes to a single point of control.

In the space control node, there can be static elements, i.e., elements that do not move in the predefined space, and motion elements, i.e., elements that move or cause movement in the predefined space. The user or operator can define the location of static elements, e.g., walls, columns, fixed scenery items, etc., in the predefined space associated with the space control node. Once the static elements are defined, the location of the static elements can be used for different purposes including collision detection with motion elements. The motion elements can be used in conjunction with a motion path or profile to create and/or implement the specific actions of the components needed to enable the object to travel the path defined by the motion profile.

The space control node can also incorporate collision detection features to prevent an object from colliding with static elements or another dynamic element, if present. In one embodiment, the collision detection feature can be implemented by defining an "envelope" around each object and then determining if the "envelopes" for the objects intersect or overlap during a simulation of the motion profile(s) for the objects. If an intersection or overlap occurs during the simulation, the operator can be notified of the possibility of a collision if the motion profiles were to be executed and can adjust the motion profile as appropriate.

During operation of the control system 100, each online or active node 210 executes one or more of its sub-processes 320 and is sharing data and information with the nodes 210. The execution of a sub-process 320 by a node 210 may require an input (e.g., a cue) from another node 210 for the sub-process 320 to continue with the execution of the sub-process 320. When an input from another node 210 is required to execute a sub-process, the node 210 can be "looking for" or expecting the input from the other node 210. In other words, the expected input at the node 210 can be a predetermined input for the node 210. However, there can be times during the operation of the control system 100, when something unexpected occurs during the performance or production and the control system 100 has to dynamically adapt to the change in operating conditions. The dynamic adaptation of the control system 100 can occur without having to restart or reboot the system 100 and can occur within an acceptable time frame (e.g., less than a second and possibly within a few milliseconds) of the unexpected occurrence.

Figure 9:
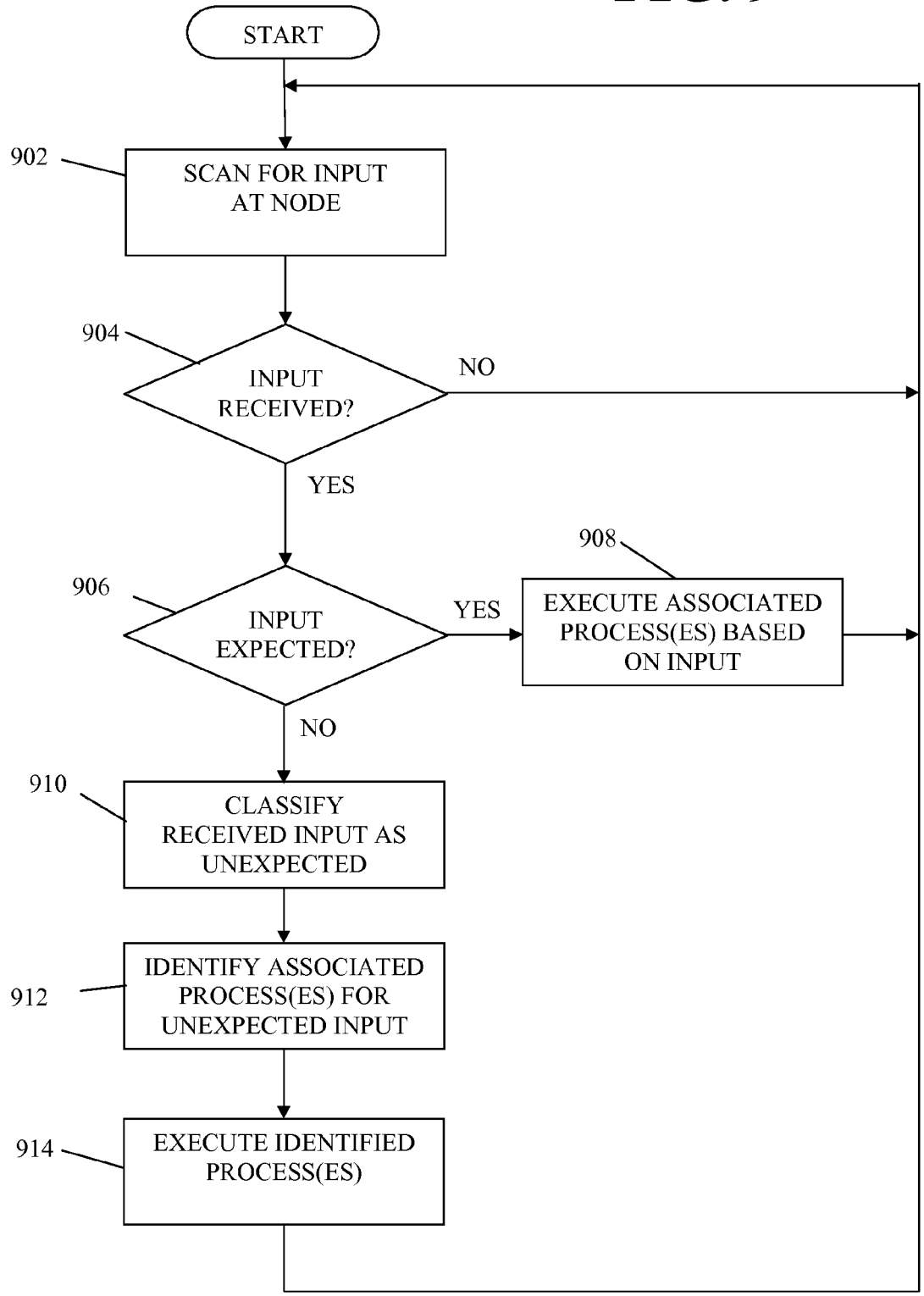
FIG. 9 shows an embodiment of a flow chart for handling unexpected inputs into the control system.

FIG. 9 shows an embodiment of a flow chart of a process for handling unexpected inputs into a node 210 of the control system 100. The process begins with each node 210 scanning or detecting for an input at the node 210 (step 902). A determination is then made on whether an input has been received by the node 210 (step 904). If an input has not been received, the process returns to the start and scans for an input at the node 210. In contrast, if an input has been received, a determination is made on whether the input is expected by the node 210 (step 906). The node 210 executes a process to analyze the signal received by the node 210 to determine if the signal satisfies the specification of a pending sub-process 320. An expected or predetermined input is an input that satisfies the specification of a pending sub-process 320 and is required by the node 210 to execute a pending sub-process 320 of the node 210. Some examples of expected inputs can be "trigger" signals or "variable" signals that are needed to continue with the execution of a sub-process 320. Some examples of trigger signals can include yes/no signals, on/off signals or digital logic signals. Some examples of variable signals are signals from an adjustable control device or controller, such as a joystick, knob or lever, that can provide a range of signals corresponding to a range of values. The variable signals can correspond to control/operational parameters such as speed, position, acceleration/deceleration, volume, frequency, brightness, contrast, balance, sharpness, fade, resolution, etc. When an expected input is received, the node 210 executes the corresponding pending sub-processes 320 associated with the expected input (step 908) and obtains the expected output. As previously discussed, the execution of a sub-process 320 could involve providing control instructions to the associated equipment or machinery of the node 210 and/or notifying other nodes 210 of the actions taken by the node 210.

In contrast, an unexpected input or an input that is not expected, i.e., a random input, is an input that does not satisfy the specification of a pending sub-process 320 in the node 210. The random or unexpected input can be a trigger signal or a variable signal from an operator console node 215 to change the operation or configuration of the node 210, including its sub-processes 320, and/or the machine or equipment associated with the node 210. The random or unexpected input can also be a trigger signal or a variable signal sent from another node 210 notifying the node 210 of a change in condition at the sending node 210 and/or changing the operation or configuration of the node 210 and/or the machine or equipment associated with the node 210. If the input is not expected, then the received input at the node 210 can be classified as an unexpected or random input (step 910). Once the received input is classified as unexpected, each sub-process 320 associated with the unexpected input has to be identified (step 912). In one embodiment, the node 210 can execute a default process associated with the receipt of an unexpected input. In another embodiment, the node 210 can execute one or more additional processes to identify the corresponding sub-processes 320 for the unexpected input.

The identification of a corresponding sub-process 320 can involve the analysis or processing of information relating to the current status or state of the node 210 and the associated equipment or machinery of the node 210. The identification of a sub-process 320 can also involve the analysis or processing of stored information relating to the node 210. Some examples of stored information relating to the node 210 can be information on the prior inputs received by the node 210 and information on the number of times a sub-process 320 may have been executed by the node 210. In another example, every time an input is processed by a node 210 there can be additional data retained by the memory 315 of the node 210 that can then be used for the identification and execution of a sub-process 320. The identified sub-processes 320 are executed (step 914) to obtain expected outputs and could involve: 1) providing control instructions to the associated equipment or machinery; 2) activating or deactivating one or more sub-processes 320 of the node 210; 3) activating (placing online) or deactivating (placing offline) one or more nodes 210; 4) enabling the sub-process 320 to accept new and/or additional inputs; 5) changing or modifying the operation of the sub-process 320 and/or 6) notifying other nodes 210 of the actions taken by the node 210, which in turn, can result in other actions or responses at the other nodes 210. In one embodiment, the execution of the identified sub-process 320 can be dependent on stored information in the node 210. The identified sub-process 320 can use the stored information as a type of control variable to perform certain actions. For example, if node 210 kept a counter value which kept track of the number of times a particular sub-process 320 was executed, the particular sub-process 320 could act or perform differently based on the number of times it was executed. After the identified sub-processes 320 are executed, the process returns to the start and scans for an input at the node 210.

Figure 10:
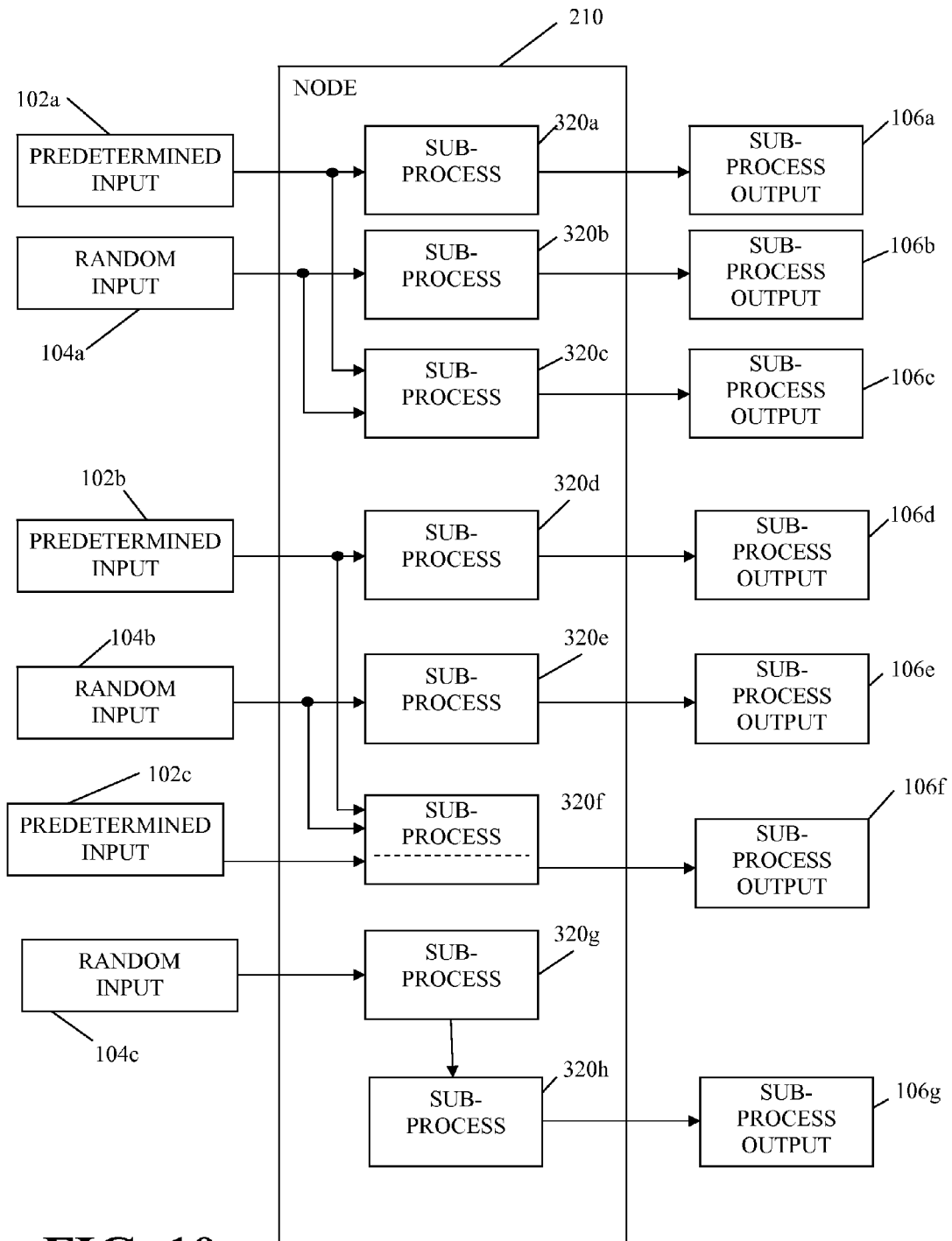
FIG. 10 shows schematically an embodiment of the relationship between inputs, processes and outputs of a node.

FIG. 10 shows an embodiment of the relationships between the inputs, outputs and sub-processes 320 of a node 210. A node 210 can receive one or more predetermined inputs 102*a-c* and/or one or more random inputs 104*a-c* associated with one or more sub-processes 320*a-h* that produce one or more sub-process outputs 106*a-g*. Predetermined inputs 102*a* and 102*b* can be provided to corresponding sub-processes 320*a* and 320*d* to obtain sub-process outputs 106*a* and 106*d*. Random inputs 104*a* and 104*b* can be provided to corresponding sub-processes 320*b* and 320*e* to obtain sub-process outputs 106*b* and 106*e*. Predetermined input 102*a* and random input 104*a* can also be provided to sub-process 320*c*. The providing of random input 104*a* to an executing sub-process 320*c* (in response to predetermined input 102*a*) can change or modify the operation of sub-process 320*c* to obtain sub-process output 106*c*. The providing of predetermined input 102*b* and random input 104*b* to sub-process 320*f* can change the configuration of sub-process 320*f* to look for predetermined input 102*c*, instead of predetermined input 102*a*, to obtain sub-process output 106*f*. The providing of random input 104*c* to sub-process 320*g* can trigger the execution of sub-process 320*h* to obtain sub-process output 106*g*.

The detection and processing of unexpected or random inputs by the nodes 210 enables the control system 100 to dynamically respond to the unexpected or random inputs by changing the configurations of the machines, equipment or systems associated with the nodes 210 to adapt to the current conditions of the performance or production. For example, a random input to a lighting control panel (an operator console node 215) can change the configuration of the associated lighting device and also trigger a movement of a robotic arm because of the relationship and interactions between the nodes 210 associated with the lighting device and the robotic arm. To continue with the example, the movement of the robotic arm can then trigger an action by a camera to change the content being recorded by the camera because of relationship and interactions between the nodes 210 associated with the camera and the robotic arm. In the second part of the example, the triggered action by the camera was not in response to an operator input (as in the first part of the example), but instead was in response to an action occurring at a related node 210 (the node associated with the robotic arm) to the node 210 associated with the camera.

In another embodiment, the nodes 210 of the control system 100 do not have to receive any unexpected or random inputs. If no random inputs are received by a node 210, the control system 100 and the nodes 210 operate "normally" in accordance with their processes.

The data for all nodes 210, including data relating to the processes for each node 210, can be made universally available to every other node 210 on the network 110 all the time, so that every node 210 is aware of the other node 210. With regard to the transfer of data, there are no processor boundaries, and data is not deemed to reside on separate processors. If one node 210 is controlled so as to care whether or not another node 210 is going too fast, the corresponding data can be known by the node 210 because all nodes 210 are constantly trading information via information packets (e.g., IP protocol packets) containing one or more data vectors. In one embodiment, the data can be stored, and made available to all the nodes 210, in a markup language format (e.g., eXtensible Markup Language—XML).

Nodes 210 can share data with all the other node 210 on the network using a redundant, load sharing, real time network that can reroute data traffic around damaged sections and alert operators to problems on the network. Each node 210 is capable of storing all of the information the node 210 requires to perform its role. Nodes 210 can communicate with each other their current status (position, movement status, direction, velocity, health of the node, how long has it been in service (length of service), how much has it been used (amount of use)). When one node 210 has a problem, the other nodes 210 can know about the problem immediately and can be programmed on how to react to the problem/failure. For example, one of the elevators in a theatrical production is ten feet high in its raised position and a performer is supposed to be flown by a winch across the space occupied by the elevator. The control system 100 can be programmed so that the winch knows not to move the performer if the elevator is raised or the control system 100 can be programmed to tell the winch to do something entirely different if the elevator fails to refract, e.g., change trajectory.

In an embodiment, the control system 100 can use the QNX real time operating system (O/S). QNX O/S is a Unix-like real-time micro kernel O/S that executes a number of small tasks, known as servers. The micro kernel allows unneeded or unused functionality to be turned off simply by not executing the unneeded or unused servers.

The control system 100 can be self-healing and self-configuring, i.e., the control system 100 can find paths to route data from each node 210 to where that data is needed by other node 210 in the system 100. The control system 100 can be architected so that there can be no single point of failure. In other words, there is no single failure that can cause a dangerous condition to occur. One failure may cause an object to stop movement or otherwise not work correctly, but such a failure will not cause a dangerous situation such as a runaway stage prop. The control system 100 can incorporate rigorous mechanical and software analysis standards, including fault analysis and failure mode effect analysis that can simulate failures at different branches of a tree-like system structure. The control system 100 can predict what will happen in different failure scenarios. If a single point of failure is found, the rules can be reset to avoid the single point of failure.

The present application contemplates methods, systems and program products on any machine-readable media for accomplishing its operations. The embodiments of the present application may be implemented using an existing computer processor, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions. Software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims. It should also be understood that the phraseology and terminology employed herein is for the purpose of description only and should not be regarded as limiting.

It is important to note that the construction and arrangement of the present application as shown in the various exemplary embodiments is illustrative only. Only certain features and embodiments of the invention have been shown and described in the application and many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. An automation and motion control system for the entertainment industry to dynamically control a plurality of objects, the automation and motion control system comprising:
    a plurality of nodes in communication with each other over a network, wherein each node of the plurality of nodes corresponds to at least one item of equipment used to a control an object of the plurality of objects, wherein each node of the plurality of nodes comprising a microprocessor and a memory device, wherein the memory device comprise node processes and at least one process executable by the microprocessor, and
    wherein the memory device store program instructions that are executable by the microprocessor to:
        determine whether an input has been received at a node the plurality of nodes of the automation and control system,
        in response to the determination, determine, by the node, whether the received input is expected,
        in response to the input being expected, execute an associated process or processes of the node processes,
        otherwise, classify the received input as a random input, wherein the random input does not satisfy a specification of a pending process,
        identify, by the node, at least one process of the node processes associated with the random of the input, and
        execute, by the node, the identified at least one process to adapt the operation of the automation and motion control system to the random input.

2. A computer implemented method of controlling plurality of objects in an automation and motion control system for the entertainment industry, the method comprising:
    determining whether an input has been received at a node of the automation and control system, the node comprising a microprocessor and a memory device;
    in response to the determination, determining, by the node, whether the received input is expected;
    in response to the input being expected, executing an associated process or processes;
    otherwise, classifying the received input as a random input, wherein the random input does not satisfy a specification of a pending process;
    identifying, by the node, at least one process of the node associated with the random input; and
    executing, by the node, the identified at least one process to adapt the operation of the automation and motion control system to the random input.

3. The computer implemented method of claim 2 further comprising scanning for an input at the node.

4. The computer implemented method of claim 2 wherein the received input is from another node or entered by an operator.

5. The computer implemented method of claim 2 wherein said executing, by the node, the identified at least one process comprises providing at least one control instruction to an item of equipment or machinery associated with the node.

6. The computer implemented method of claim 2 wherein said executing, by the node, the identified at least one process comprises activating or deactivating one or more separate processes of the node.

7. The computer implemented method of claim 2 wherein said executing, by the node, the identified at least one process comprises activating or deactivating one or more separate nodes.

8. The computer implemented method of claim 2 wherein said executing, by the node, the identified at least one process comprises enabling the at least one process to accept at least one of new or additional inputs.

9. The computer implemented method of claim 2 wherein said executing, by the node, the identified at least one process comprises modifying the operation of the at least one process.

10. The computer implemented method of claim 2 wherein said executing, by the node, the identified at least one process comprises notifying one or more separate nodes of the actions taken by the node and taking at least one action or response at the one or more separate nodes.

\* \* \* \* \*